March 18, 1930. W. W. BRUST 1,751,390
BOX FORMING AND SEALING DEVICE
Filed May 13, 1927 6 Sheets-Sheet 1

INVENTOR
W. W. BRUST
BY
ATTORNEY

March 18, 1930.　　　W. W. BRUST　　　1,751,390
BOX FORMING AND SEALING DEVICE
Filed May 13, 1927　　　6 Sheets-Sheet 5

INVENTOR
W. W. BRUST
BY Munn & Co.
ATTORNEY

Patented Mar. 18, 1930

1,751,390

UNITED STATES PATENT OFFICE

WALTER W. BRUST, OF WESTON, WEST VIRGINIA

BOX FORMING AND SEALING DEVICE

Application filed May 13, 1927. Serial No. 191,209.

This invention relates to a box-forming and sealing device.

An object of the invention is the provision of a device adapted to fold a blank about materials to be stored in a box and for applying a sealing tape to the abutted edges after said blank has been formed into a box-like structure.

Another object of the invention is the provision of a device adapted to receive a blank which has been indented for determining the side walls and the bottom and top of a box while at the same time applying a sealing tape to the abutted edges of the blank whereby the materials which are stored in the box are sealed therein, means being provided for properly applying the tape in a uniform manner across the abutted edges of the box.

A further object of the invention is the provision of a device for forming a blank into a box while at the same time enclosing materials to be stored in said box, the forming device being adjustable for various widths of the boxes, with a sealing element for moistening and applying a cemented tape to a pair of the abutted edges of the blank after having been formed into a box-like structure.

A still further object of the invention is the provision of a device for forming and sealing materials in a box in a very economical and efficient manner, the materials being any form of strips of cut lumber particularly for finishing the interior of buildings, or other materials.

This invention will be best understood from a consideration of the following detailed description, in view of the accompanying drawings forming a part of the specification; nevertheless, it is to be understood that the invention is not confined to the disclosure, being susceptible of such changes and modifications which shall define no material departure from the salient features of the invention as expressed in the appended claims.

Referring to the drawings it will be seen that the box-forming and sealing device consists of a primary former in which the finishing strips of lumber are applied to the blank, a forming device in which the indented corrugated paper is folded in snug relation with the materials located in the partially formed box, a sealing device for applying the moistened cemented tape, the device for uniformly maintaining or brushing the applied tape evenly after the tape has been applied, a device for cutting the free end of the applied tape, and an operating mechanism for driving the moving parts connected with the box-forming device.

The primary former includes a pair of longitudinal side bars 10 secured in any approved manner to the longitudinal beams 11 which are located in spaced parallel relation and supported above the floor of the factory by means of legs 12. The bottom 13 of the blank rests upon a traveling carrier or belt 14 which is supported by rollers 15. These rollers are rotatably mounted in the brackets 16 secured in any approved manner to the longitudinal beams 11. The belt 14 is trained over an idler pulley 17 which has a shaft 18 carried in bearings at the upper end of standards 19 which are likewise secured to the floor and beneath the longitudinal beams 11.

The blank from which the box is to be formed is placed between the side bars 10 with the bottom 13 resting on the belt 14 and since this blank has been previously creased the side walls 20 of the box which is in the process of formation, rise vertically from the bottom and in contact with the side bars 10. A pair of flaps 21 project upwardly and in alignment with the walls 20. An indented portion 22 forming a line between the side wall 20 and and its respective flap 21 permits the turning over of the flap in horizontal alignment as will be presently described.

The main forming device includes a framework which provides a supporting structure for said forming device and consists of a pair of longitudinal beams 23 and inclined legs 24. The legs are braced by means of bars 25. The longitudinal beams 23 are maintained in parallel spaced relation by means of transverse brace bars 26 secured to the bottoms of said beams. The forming device consists of a pair of metal members 30 and 31, each member has a vertical portion 32 extending downwardly and in close association with a pair of adjusting bars 33, said adjusting bars being disposed in parallel relation and between the pair of longitudinal beams 23. The inner ends of the formers, as shown at 34, are flared outwardly in order to receive the partially formed box 35 from the primary former. A strap 36 has a slot 39 to receive a bolt 40. This bolt is rigid with a strap 41 secured to the outer face of a forming plate 30. By loosening the nut on the bolt 40 the outer end 34 of the former plate may be adjusted in a vertical plane. The inner end of the former plate is bent inwardly and downwardly as shown at 43 so that the plate at its inner end will force the members 21 of the box 35 downwardly into close contact with the materials packed in the box. A strap 37 is secured to the bar 33 by a flange 38.

The inner ends are adjusted in a vertical manner by means of a rod 44 adjustably mounted in a bearing 45 pivoted at 46 to a bracket 47 secured to the outer face of the adjusting bar 33. The bearing 45 is provided with a set screw 48 for locking the rods 44 in an adjusted position. Said rods are pivoted to a pair of ears 50 formed integrally with the inner ends of the former plates 43.

A strap 55 which is similar to the strap 37 is secured to a bar 33 by a flange 56 and has a bearing to receive the lower end of a shaft 57 to which is rigidly connected a pulley 58. The strap 37 also has a bearing adapted to receive the upper end of the shaft 57 so that the pulley 58 is carried directly by the adjusting bar 33. On each side of the former device a belt 60 is provided and trained about the pulley 58 at the inner end of the machine and also trained about a second pulley 61 at the outer end of the same. The belts are adapted to travel beneath the lower edge of the former plates 30 and 31 and in vertical alignment with said plates so that said belts will be in close contact with the side walls 20 of the box 35. The pulleys 61 are mounted in bearings at the ends of the U-shaped bracket 62 which is secured to the outer ends of the adjusting bars 33.

When boxes of different widths are moved through the forming device it is necessary to adjust the former plates either towards or away from each other and the mechanism will now be described which provides for such adjustment to vary the spacing of the former plates 30 and 31 by means of varying the position of the adjusting bars 33. The lower ends of the adjusting bars having secured therein threaded bolts 65 provided with thumb nuts 66 which are adapted to engage the underface of the transverse bar 67 secured to the longitudinal beams 23. The bar 67 is provided with a slot 68 shown in dotted lines in Figure 4 adjacent each threaded bolt 65 and through which said bolt is inserted whereby said bolt may be moved longitudinally of the transverse bar 67 for varying the space between the adjusting bars 33 at their lower ends.

Figure 4:
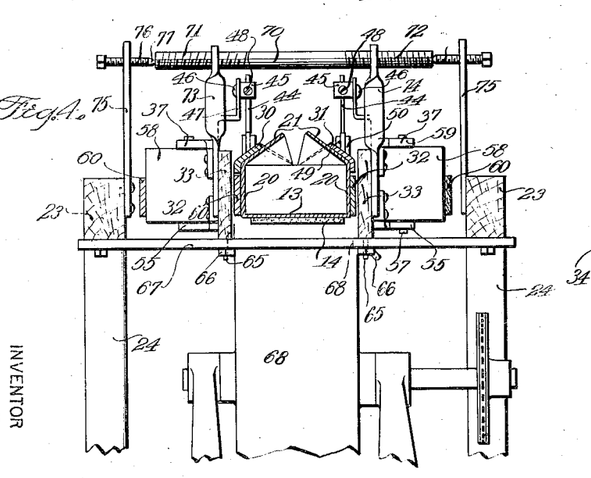
Figure 4 is a transverse vertical section taken along the line 4—4 of Figure 3.
Figures 5, 6:
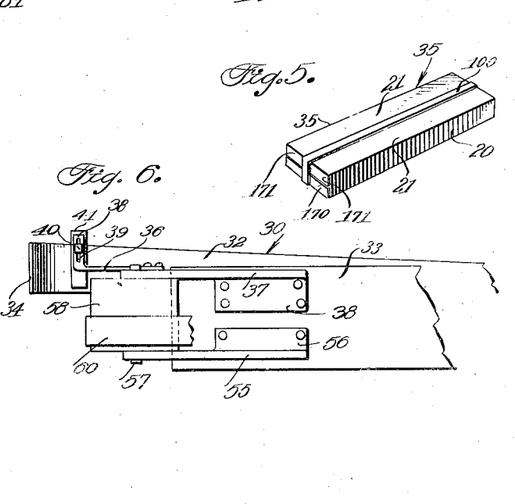
Figure 5 is a view in perspective of a box sealed.
Figure 6 is a fragmentary side view of the adjusting means for the formers.

The upper ends of the bars 33 are adjusted by means of a screw 70 which has a left hand thread 71 and a right hand thread 72. The upper end of the standard 73 forms a nut adapted to receive the threads 71 while the upper end of a standard 74 has a threaded perforation to receive the threads 72 so that when the screw 70 is rotated the standards 73 and 74 will be moved towards or away from each other depending upon the direction of rotation of the screw 70. The lower ends of each of the standards 73 and 74 are respectively secured to an adjacent adjusting bar 33. A bracket 75 secured at its lower end to an adjacent longitudinal beam 23 has a threaded passage to receive a screw 76. This screw has a pointed end 77 adapted to be received within a socket at an end of the screw 70 and provides a pintle or bearing for the screw 70. A brace bar 78 is secured at its opposite ends to the brackets 75. By rotation of the screw 70, as has been explained, the bars 33 after the nuts 66 have been loosened are adjusted towards and away from each other in order to provide for the proper spacing between the belts 60 at opposite sides of the box 35 in order that said belts will be in close association with the side walls 20 of said box. It will be noted that a similar adjusting means for the outer ends of the bars 33 is provided. By the adjustment of the opposite ends of the bars 33 the pulleys 58 and 61 are moved towards and away from each other. However, at this time it will be necessary to loosen set screws 80 carried by hubs 81 of bevel gears 82 on the shaft 83 in order that the bevel gears which are mounted in spaced relation on said shaft may be adjusted in proper meshing relation with the respective bevel gears 84 secured to the upper ends of shafts 57 to which the pulleys 61 are secured so that when said shafts are driven the pulleys are likewise driven for driving the belt 60.

The shaft 83 is driven by means of a chain 86 trained over a sprocket 87 on the outer end of the shaft 83 and a sprocket 88 on a drive shaft 89. This drive shaft is mounted in bearings 90 at the upper ends of standards 91 located beneath the former and embraced by the supporting frame. A fly-wheel 92 is secured to the shaft 89 and is driven by means of a belt which has operative connection with a power plant (not shown).

Figures 1, 2:
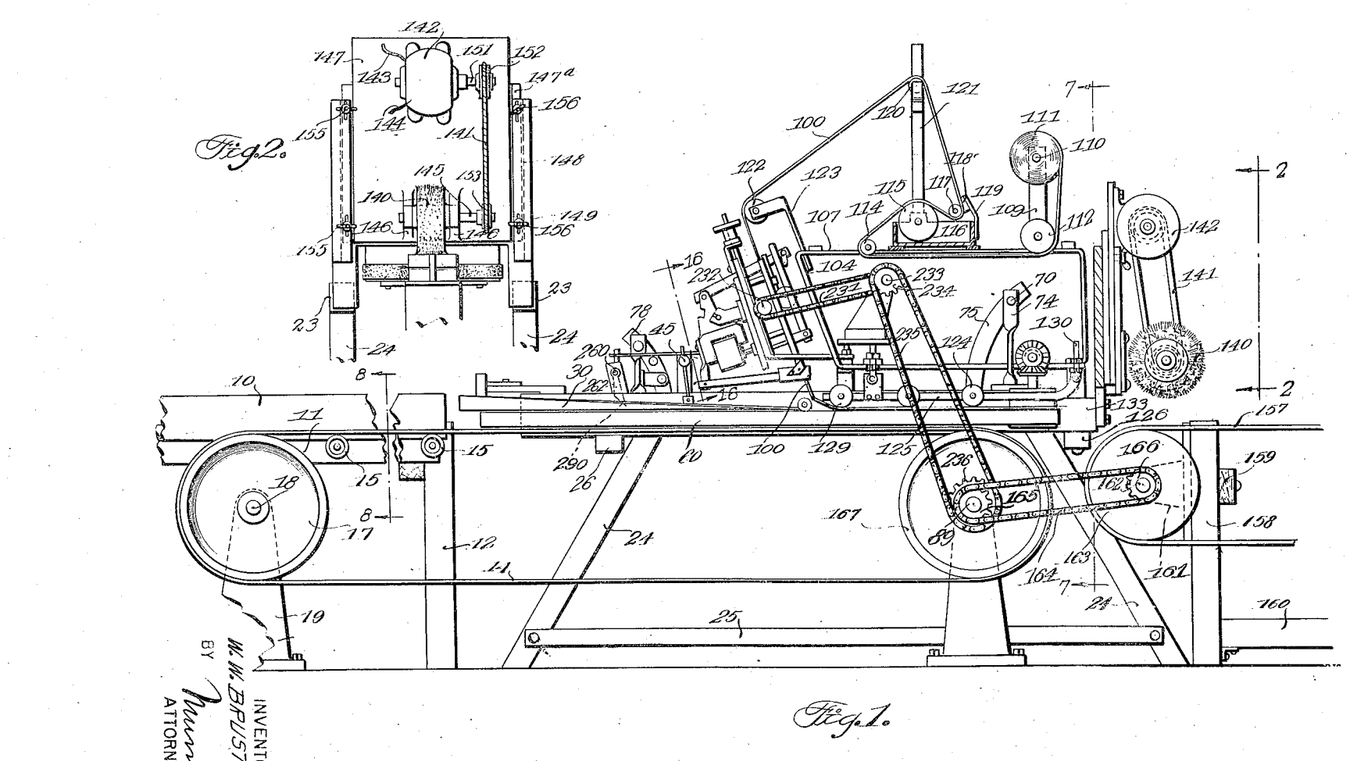
Figure 1 is a vertical longitudinal section of the box-forming and sealing device.
Figure 2 is a fragmentary end view as indicated by the line 2—2 of Figure 1.
Figure 3:
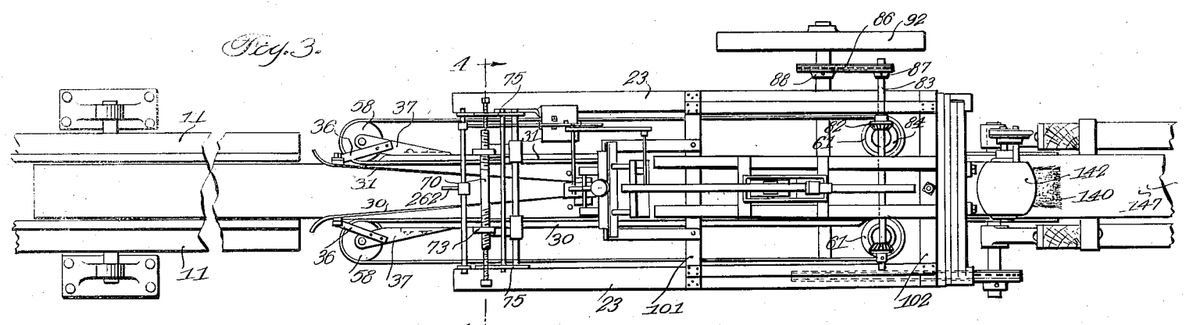
Figure 3 is a longitudinal plan view of the box-forming device.

A tape 100 which is provided with a cement on one side and moistened is carried by a plurality of rollers shown more particularly in Fig. 1 so that said tape may be applied to the upper surface of the box for sealing the flaps 21 and for embracing the ends of the box for sealing the end flaps to provide a secure closure for said box. A supporting structure for the tape applying structure is mounted on the beams 23 through bars 101, 102 which are located transversely of the frame. A pair of parallel bars 103 extend longitudinally of the former and above the same and secured at their forward ends to the bar 101 and to the rear transverse bar 102. Strap irons are bent to form rear legs 105 inclined front legs 106 and horizontal supports 107. The horizontal supports are connected together by means of brace bars 108.

Brackets 109 are secured to the horizontal bars 107 and are provided with bearings for an axle 110 which carries a roll 111. The tape is brought downwardly over a pulley 112 having an axle 113 mounted in bearings in the brackets 109. The tape is then carried over a pulley 114 carried by the horizontal bars 107 and then over a moistening roller 115 mounted in a casing 116 which is partially filled with water in which the roller 115 revolves. The tape is then brought around a roller 117 carried in bearings at the upper end of the casing 116 and a felt brush 118 contacts with the moistened and cemented face of the tape, this felt being carried by an arm 119 secured to the rear wall of the casing 110. The tape is then brought upwardly and carried over a roller 120 secured in bearings over brackets 121. The tape is brought downward at an angle and carried over a roller 122 mounted in bearings at the end of a bracket 123 secured to transverse bars 104. The tape with its cement face is forced into contact with the upper face of the box 35 and bridges the abutted ends of the flaps 21 of the upper face of the box after said tape has passed through a severing device.

This tape is applied by means of a series of rollers 124 which have their axles mounted in a frame 125. This frame is adjustable at its inner end by means of a rod 126 secured to a strap 127 rigid with the frame 125. The upper end of the rod 126 is threaded and adapted to receive nuts 128 and 129. A threaded bolt 130 is provided with nuts 131 and 132 for vertically adjusting the bolt and for maintaining it in predetermined position.

Figures 7, 8, 9:
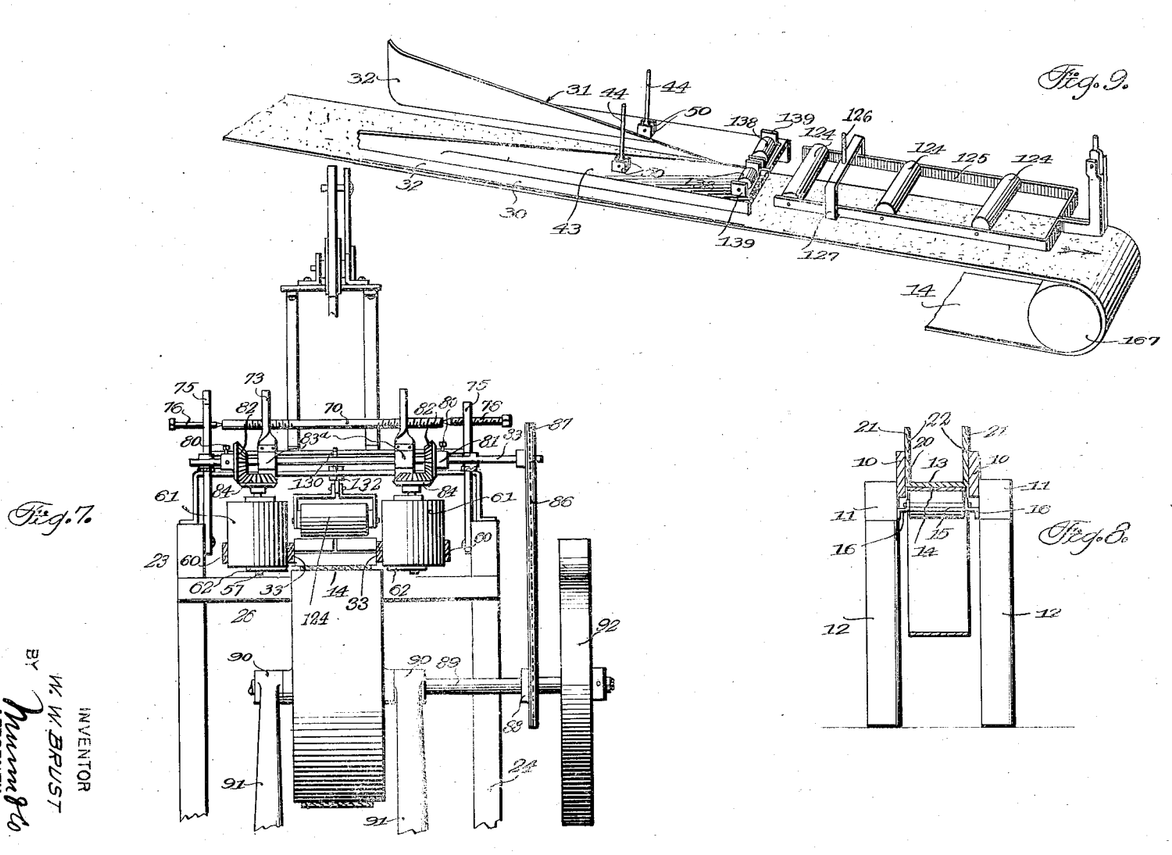
Figure 7 is a transverse vertical section taken along the line 7—7 of Figure 1.
Figure 8 is a fragmentary vertical section taken along the line 8—8 of Figure 1.
Figure 9 is a view in perspective disclosing the box forming plate in cooperative relation with the tape applying means.
Figure 10:
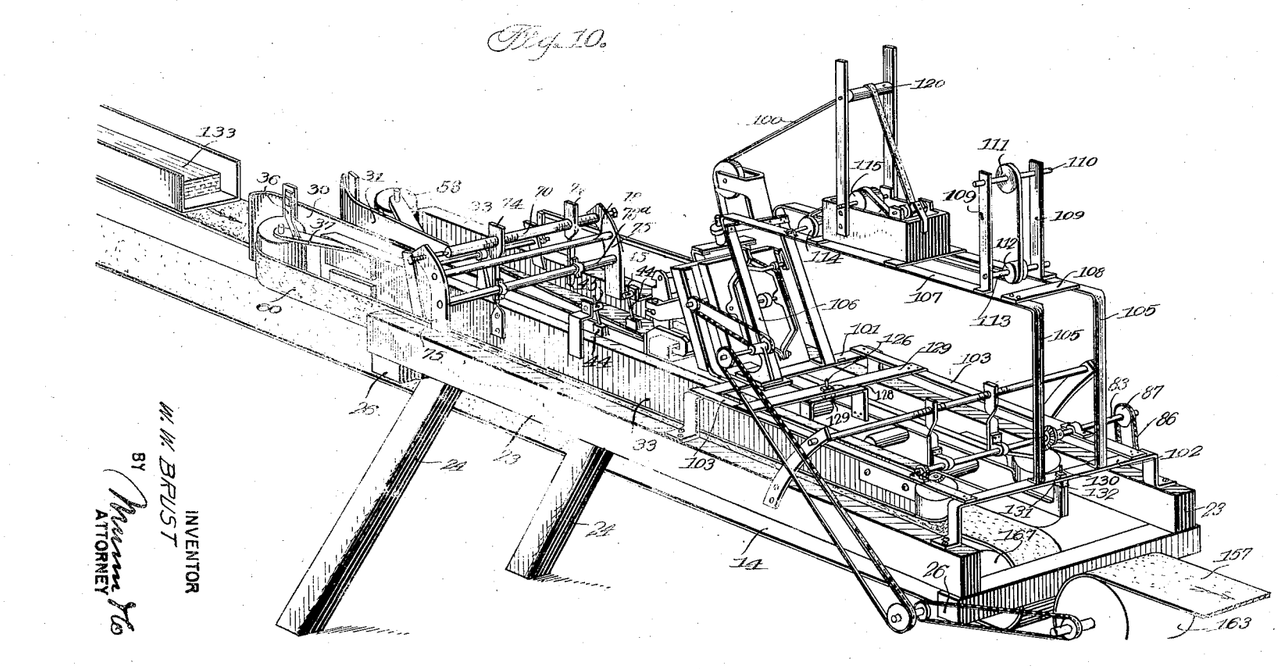
Figure 10 is a view in perspective of a box forming device constructed according to the principles of my invention.

In order that the flaps 21 of the box will be rigidly pressed into engagement with the material 133 in the box I have provided a pair of rollers 138 (Fig. 9) carrying bearings in ears 139 formed integrally with the inner ends of the former plates 30 and 31. At this point the plates are cut away not only to form the ears but to afford opening so that the rollers 38 carried by each inner end of the plates will engage and force the flaps 21 downwardly.

It is necessary that the tape after being moistened and having a cement side applied to the box 35 be brushed so that it will be evenly distributed over the abutted edges of the flaps 21. For this purpose I have provided a brush 140 driven through a belt 141 connected to a motor 142. This motor is operated independently of the forming device and is connected by means of wires 143 and 144 to the usual house current. The brush is mounted on an axle 145 carried by brackets 146 which are secured to a carriage 147 mounted on a frame 147a slidably mounted in tracks 148 in uprights 149 secured to the longitudinal beams 133. A shaft 151 of the motor 142 has a pulley 152 which with the pulley 153 on the shaft 145 receives the belt 141. Threaded bolts 155 are secured to the frame 147a and movable in slots in the uprights 149. Thumb nuts 156 threaded onto the bolts 155 are adapted to lock the frame 147 in an adjusted position so that the proper contact of the brush 140 may be maintained on the tape when the sealed box moves from the forming device onto a traveling carrier 157.

Beyond the forming device is provided a frame 158 properly braced by bars 159 and 160 and has brackets 161 provided with bearings for a shaft 162 to which is rigidly connected a drum 163. The belt 157 engages around a drum 163 which is driven by means of a chain 164, a sprocket 165 on the shaft 89 and a sprocket 166 on shaft 162. The belt 157 is adapted to receive the sealed packages for conveying said packages away from the forming device. A pulley 167 driven by the shaft 89 receives the belt 14 for driving said belt.

The operation of my device for forming the blanks over the materials is as follows: The creased or indented blanks from which the boxes are formed are placed on the belt 14 or a similarly driven belt in the primary former and the materials 133 are neatly packed in the unformed blank. The blank together with the materials are then moved forwardly by the traveling carrier 14 and through the flared ends 34 of the former plates 30 and 31. As the forward ends of the flaps 21 are moved into the former plates and since these former plates are gradually bent downwardly at the top, the flaps 21 are forced down into engagement with the material 133 until the former end of the box passes beneath the roller 138 whence the flaps are in tight engagement with materials. Beyond this point the first roller 124 of the series forces the moistened tape 100 into engagement with the top of the box and across the abutted ends of the flaps 21 and since the cemented face of the tape is forced down onto the flaps the tape adheres to the same and as the box is being moved forwardly by co-operation of the belt 14 and side belts 60 the tape is pulled inwardly with the moving box and rolled flat onto the flaps. When the forward end of the box reaches the revolving brush 140 the tape is brushed and thereby spread out uniformly over the flaps.

However, I propose to apply an automatic cutting device which is connected to the arms 106 of the frame 105 with the tape passing through the cutting device which is automatically severed when the rear end of the box passes beyond this point. A modified form of the cutting device described and claimed in my co-pending application, Serial No. 161,902 filed January 18, 1927, is employed for the purpose of automatically severing the tape when the box has passed a predetermined point in the box forming device.

Referring more particularly to Figs. 11 to 18 inclusive, it will be seen that an automatic device is shown in detail for cutting the tape after the box 35 has passed beyond the cutting device and which means is employed for moving the tape to an operative position to be engaged by a succeeding box. A frame is provided for supporting the cutting device and comprises a pair of brackets 200 inclined at an angle to the vertical and which are connected to the transverse bar 101, in spaced relation and extending forwardly of the tape moistening device. Secured to the upper end of the brackets 200 are straps 201 to which is connected at the free end, a plate 202. A sleeve 203 rests on the plate 202 and receives the screw 204. A nut 205 has threaded engagement with the screw 204 so that when the said nut is revolved in opposite directions, the screw will be adjusted vertically over a base plate 206 slidably mounted in guides on the brackets 200. The screw is connected at 207 to said base plate.

Secured to the base plate 206 are brackets 208 which have pivotal mountings at 209 for a lever 210. An armature 211 is connected to the lever 210 and is adapted to be drawn inwardly by a coil 212 carried by a bracket 213 from the base member 206. A pair of springs 215 are secured to the transverse bar 214 and adapted to have its free ends to engage the coil 212 when the armature is moved inwardly of the coil which will maintain the springs under tension and will tend to force the armature from the coil when the current has been cut off from said coil.

A rod 216 is pivotally connected at its free end with a rod 217 which extends forwardly of the forming device and connected as shown at 218 with a cutting blade 219 having a cutting edge at 220 which is adapted to be moved across the slot 221. The knife is maintained within a guide or cutting table 222 having depending flanges 223 which embrace the opposite side edges of the knife. The blade is provided with slots 224 which receive headed pins 225, the heads of the pins being of sufficient size to overlap the side edges of the slots 224. These pins are secured to the cutting table 222. This table is secured by means of a U-shaped bracket 226 to a guide plate 227 secured by means of brackets 228 to the base plate 206. This guide plate receives the tape 100 from the roller 122.

A pair of toothed rollers 229 are mounted in spaced relation on a shaft 230, the shaft being driven through a chain 231 in the sprocket 232, the chain 231 is driven by means of a shaft 233 in sprocket 234 and a chain 235 is driven in turn by a sprocket 236 on the shaft 89. The shaft 230 and wheels 229 are driven continuously adjacent a pair of slots 240. The tape 100 passes between the slots 240 and the driven rollers 229. A pair of rollers 241 are mounted for rotation on a shaft 242 which is carried by a movable frame 243 hingedly mounted at 244 on a bracket 245 which is carried by the guide plate 227. A frame 243 is connected by means of springs 246 with the guide plate 227 whereby the said springs tend to move the frame towards the member 227 for forcing the rollers 241 into the slots 240. A pin 247 is secured to the shaft 242 and projects normally inwardly towards the guide plate 227, and is adapted to normally engage said plate since the springs 246 force the frame and likewise the shaft 242 and pin 247 into engagement with said plate. This pin is adapted to be rocked downwardly in contact with the plate 227 whereby the frame 243 will be moved outwardly from the plate 227 momentarily against the tension of the springs 246 until the pin passes the dead center. At this time the springs will turn the frame towards the plate 227 forcing the rollers 241 in the slots 240 likewise forcing the tape 100 into engagement with the constantly revolving toothed rollers 229 whence the tape 100 is forced downwardly by the revolving rollers 229. The pin after having revolved to approximately an arc of 360 degrees, again returns to its normal operative position and engages the plate 227. At this time the rollers 241 are forced sufficiently away from the slots 240 to move them out of engagement with the tape 100 whereby the said tape will remain stationary until the pin is again moved past its dead center and while in contact with the plate 227.

For oscillating the pin I provide a reciprocating rod 250 slidably mounted in a guide 251 having a head 252 provided with a slot 253 in which projects the bent end 254 of a rock shaft 255. This rock shaft is connected by means of a lever 256 with a link 257 which in turn is connected by rod 258 with the upper end of the lever 210. Since the said lever is rocked the shaft 255 will be rocked for reciprocating the rod 250 which is moved into engagement with the pin 247 for forcing said pin past the dead center where the pin is in engagement with the guide plate 227.

A rock shaft 260 is mounted in bearings in a pair of spaced standards 261 which are secured in any approved manner to the framework of the box forming device. The rock shaft has a pawl 262 adapted to be engaged by the box 35 as it moves therethrough. A lever 263 is secured to the rock shaft 260 and a reciprocating rod 264 has one end secured to the free end of the lever 263 and is slidably mounted in bearings carried by brackets 265 secured to a base plate 266. This base plate carries a pair of contact members 267 and 268 which together with a movable contact member 269 forms a switch for opening and closing the circuit to the coil 212. The member 267 has a vertical flange 270 while the member 268 has a flange 271 inclined at an acute angle to the plane of the flange 270 and spaced from said flange so that the contact member 269 may pass through the members 267 and 268 and engage both members for closing the circuit, but will engage the outer edge 273 of the flange 271 for forcing the member 269 away from the flange 270.

Contact 268 is connected by means of a wire 274 with a suitable source of current while the wire 275 connects contact 267 with a coil 212. A wire 276 connects the other terminal of the coil 212 with the other pole of the source of current. Brackets 277 are adapted to secure the base member 266 to the frame of the box forming machine and for maintaining the same in spaced relation with the forming members 30 and 31.

Figures 11, 12, 13, 14, 15, 20:
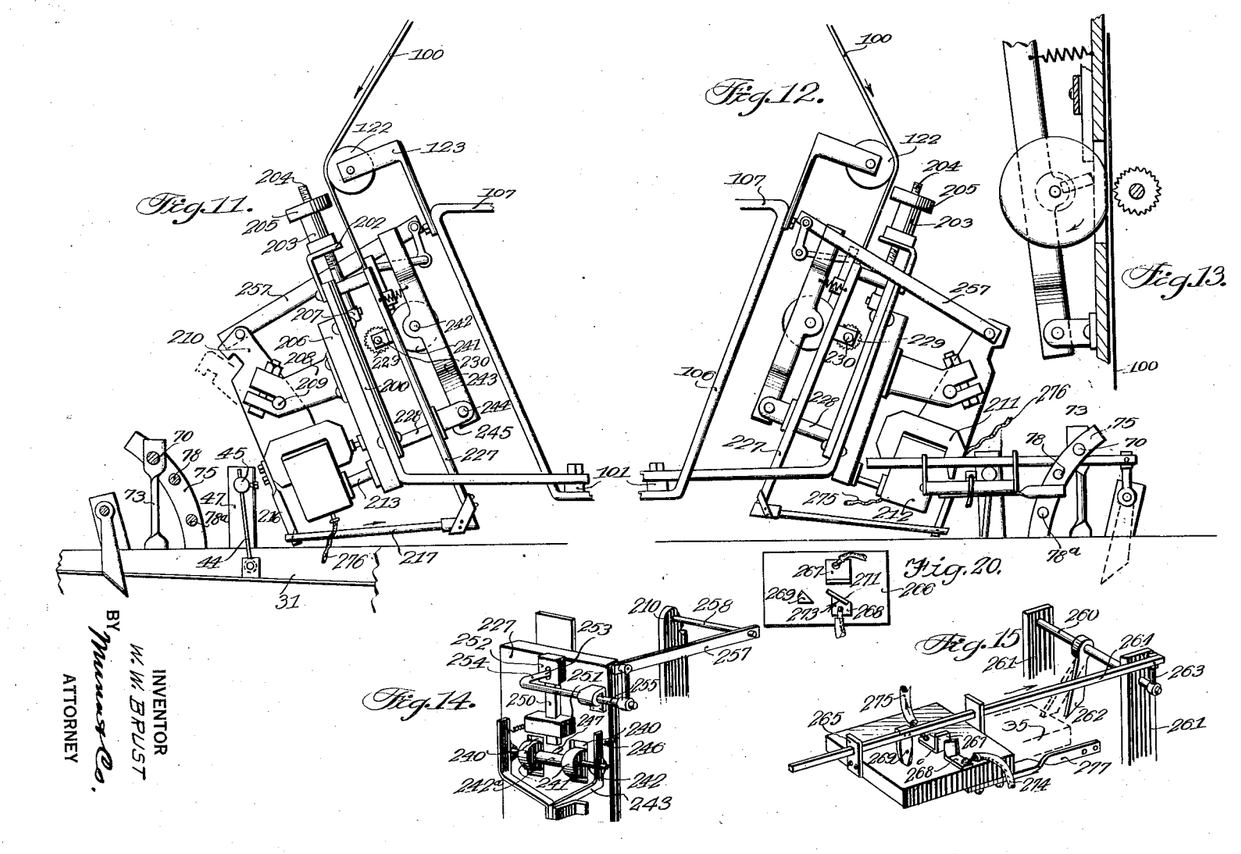
Figure 11 is a detached side view of an operating device for a tape cutter.
Figure 12 is a similar view showing the opposite side of the device.
Figure 13 is a fragmentary vertical section of the device for moving the tape through the cutter.
Figure 14 is a fragmentary view in perspective of a device for controlling the tape moving means.
Figure 15 is a fragmentary view in perspective of a switch for controlling electrical operating means for the knife.
Figure 20 is a plan view of the switch shown in Fig. 15.
Figures 16, 17, 18, 19:
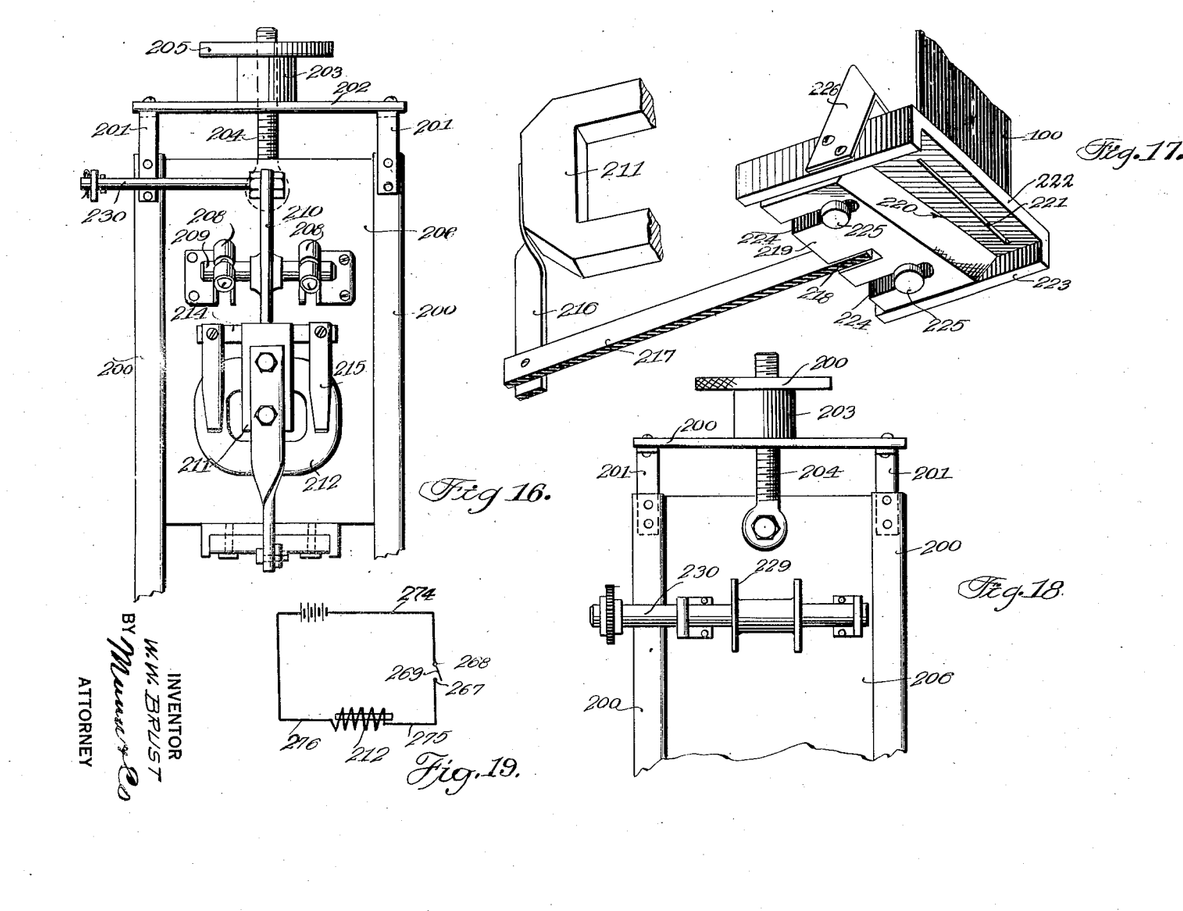
Figure 16 is a fragmentary end view of the device shown in Fig. 11.
Figure 17 is a perspective of the knife with certain of its operating parts.
Figure 18 is a fragmentary view in elevation of a device for moving the tape through the cutting mechanism.
Figure 19 is a diagram of the electric circuit.

The operation of my device is as follows:

A box 35 is moved through the forming device by the belt 14 and when the forward end reaches the pawl 262 it engages the inclined edge 290 thereby oscillating the pawl, rocking the shaft 260 and reciprocating the rod 264 in the direction indicated by the arrow in Fig. 15. A contact member 269 is moved in the same direction as the rod causing the outer edge to engage the inclined face 273 of the flange 271 of the contact 268, causing the contact 269 to spring to one side and move beyond the flange 271 whence it will spring back into place and be in line with the inner inclined face of the flange 271 so that it can be forced between the contacts 270 and 273 for closing the circuit to the coil 212.

When the box moves away from the end of the pawl 262 it will fall by reason of its own weight or by the addition of a spring to the full line position shown in Fig. 15 thereby rocking the shaft in the opposite direction and moving the rod 264 opposite to the direction indicated by the arrow. The outer end of the member 269 will engage the inner inclined face of the flange 271 and move along the same until it reaches the point where it will contact with both members 270 and 273 thereby closing the circuit to the coil 212. At this time the armature 211 is moved inwardly of the coil forcing the rod 217 in the direction indicated by the arrow in Fig. 11 and causing the knife 220 to be moved across the slot 221 thereby shearing the tape 100.

As the lever 210 is rocked by the armature 211 the rod 257 is reciprocated, rocking lever 255 and causing the arm 254 to be moved downwardly in the direction indicated by the arrow in Fig. 14 whereby the rod 250 will engage the pin 247 forcing it past the dead center where it is engaged with the plate 227 while moving the rollers 241 farther away from the slots 240. As soon as the pin 247 is forced past its position at right angles to the plate 227 the springs 246 will force the frame 243 towards the plate 227 and move the rollers 241 through the slots 240 into engagement with the tape 100 and forcing said tape into operative engagement with the toothed rollers 229. Since these rollers rotate continuously they will force the tape downwardly through the guide member 227 so that the severing end of the tape will be moved downward sufficiently into the path of a succeeding box where the tape will be applied across the adjacent edges of the flaps 21.

It will be appreciated that the downward movement of the tape which is caused by the rollers 229 will only be momentary since the rollers 241 are revolved by the downwardly moving tape in connection with the rollers 229 whereby the pin 247 is connected to the shaft 242 through a sleeve 242ª which will be rotated until said pin again engages the plate 227 and the source which is impelling the rollers 241 will be sufficient to cause the shaft 242 to rotate sufficiently at the time that the pin 247 engages the plate 227 to again force the frame 243 outwardly from said plate and move the rollers out of engagement with the tape.

Since the closing of the circuit by the member 269 is only momentary, the actuation of the armature 211 and the rod 217 and its connected knife 220, and the rod 257 at its associated parts, will only be for a short duration, therefore the knife will be immediately withdrawn from its cutting position in the slot 221 and the rod 250 will be elevated by the reverse rocking of the shaft 255 and the reverse movement of the lever 210.

The ends of the boxes are sealed manually after they have been released by the box forming device and after they have been discharged upon the moving belt 157.

I claim:

1. A device of the character described comprising a supporting structure, a pair of spaced box-forming plates located longitudinally of the structure, a traveling carrier for moving a box filled with materials through the plates, means for varying the spacing between said plates, adjusting bars carrying the plates, traveling belts engaging the sides of the box and supported by the bars whereby spacing of the plates and belts may be varied simultaneously.

2. A device of the character described comprising a supporting structure, a pair of spaced box-forming plates located longitudinally of the structure, a traveling carrier for moving a box filled with materials through the plates, means for varying the spacing between said plates, adjusting bars carrying the plates, traveling belts engaging the sides of the box and supported by the bars whereby spacing of the plates and belts may be varied simultaneously, and pulleys for driving the belt and bearings for the pulleys carried by the bar.

3. A device of the character described comprising a supporting structure, a pair of spaced box-forming plates located longitudinally of the structure, a traveling carrier for moving a box filled with materials through the plates, means for varying the spacing between said plates, adjusting bars carrying the plates, traveling belts engaging the sides of the box and supported by the bars whereby spacing of the plates and belts may be varied simultaneously, pulleys for driving the belt and bearings for the pulleys carried by the bar, and adjustable driving means for causing rotation of the pulleys and adapted to be adjusted when bars are moved.

4. A device of the character described comprising a supporting structure, a pair of spaced box-forming plates located longitudinally of the structure, a traveling carrier for moving a box filled with materials through the plates, means for varying the spacing between said plates, means for supplying a cemented tape to the box, adjusting bars carrying the plates, traveling belts engaging the sides of the box and supported by the bars whereby spacing of the plates and belts may be varied simultaneously, pulleys for driving the belt and bearings for the pulleys carried by the bars, adjustable driving means for causing rotation of the pulleys and adapted to be adjusted when bars are moved, a frame located in advance of the inner ends of the forming plates, and a plurality of rollers supported in the frame adapted to engage the top of the moving box.

5. A device of the character described comprising a supporting structure, a pair of spaced box-forming plates located longitudinally of the structure, a traveling carrier for moving a box filled with materials through the plates, means supplying a cemented tape to the box, means for automatically cutting the tape when the box passes beyond the box forming plates, means for periodically actuating cutting means, means controlling the actuating means and set in motion by the moving box.

6. A device of the character described comprising a supporting structure, a pair of spaced box-forming plates located longitudinally of the structure, a traveling carrier for moving a box filled with materials through the plates, means supplying a cemented tape to the box, means adapted to be engaged by the moving box, a switch adapted to be closed momentarily by the last mentioned means, a circuit, electrical means in the circuit adapted to be energized, and a knife actuated by the electrical means for causing severing of the tape.

7. A device of the character described comprising a supporting structure, a box forming means, a traveling carrier for moving a box filled with materials through the box forming means, means for supplying cemented tape to the box and means automatically cutting the tape after the box has past the box forming means, and comprising a coil, an armature actuated by the coil, a knife, means connecting the knife with the armature for causing reciprocation of the knife across the path of the tape for severing the same, means for causing movement of the tape after the same has been cut into the path of a succeeding box, said means being connected with the armature for causing momentary actuation of a moving means for causing the tape to be placed in the path of the moving box.

8. A device of the character described comprising a supporting structure, a box forming means, a traveling carrier for moving a box filled with materials through the box forming means, means for supplying cemented tape to the box and means automatically cutting the tape after the box has past the box forming means, and comprising a coil, an armature actuated by the coil, a knife, means connecting the knife with the armature for causing reciprocation of the knife across the path of the tape for severing the same, means for causing movement of the tape after the same has been cut into the path of a succeeding box, said means being connected with the armature for causing momentary actuation of a moving means for causing the tape to be placed in the path of the moving box, and means adapted to be actuated by the moving box for causing energization of the coil.

9. In a box forming device, a box forming means, means for moving a box filled with materials through the box forming means, means for supplying a cemented tape to the box, a cutting device for the tape through which the tape is moved and provided with a blade for cutting the tape, means for reciprocating the blade for cutting the tape, means actuated by the box for setting the reciprocating means for the knife into operation, means for moving the tape in cutting relation with the knife, means for causing the moving means for the tape to become inoperative during the cutting operation, and means for causing the moving means for the tape to be set in operation temporarily after the cutting operation to provide a free portion which is moved into operative relation with a succeeding box.

10. In a box forming device, a box forming means, means for moving a box filled with materials through the box forming means, means for supplying a cemented tape to the box, a cutting device for the tape through which the tape is moved and provided with a blade for cutting the tape, means for reciprocating the blade for cutting the tape, means actuated by the box for setting the reciprocating means for the knife into operation, means for moving the tape in cutting relation with the knife, means for restraining actuation of the moving means for the tape during the cutting operation, and means for causing the moving means for the tape to be set in operation temporarily after the cutting operation to provide a free portion which is moved into operative relation with a succeeding box.

11. In a box forming device, a box forming means, means for moving a box filled with materials through the box forming means, means for supplying a cemented tape to the box, a cutting device for the tape through which the tape is moved and provided with a blade for cutting the tape, means for reciprocating the blade for cutting the tape, means actuated by the box for setting the reciprocating means for the knife into operation, means for moving the tape in cutting relation with the knife, means for restraining temporarily actuation of the moving means for the tape during the cutting operation, and means for releasing the restraining means to permit moving means to force the free end of the tape into engagement with a succeeding box.

12. In a box forming device, a box forming means, means for moving a box filled with materials through the box forming means, means for supplying a cemented tape to the box, a cutting device for the tape through which the tape is moved and provided with a blade for cutting the tape, means for reciprocating the blade for cutting the tape, means actuated by the box for setting the reciprocating means for the knife into operation, means for moving the tape in cutting relation with the knife, means for restraining actuation of the working means for the tape during the cutting operation, means for causing the moving means for the tape to be set in operation temporarily after the cutting operation to provide a free portion which is moved into operative relation with a succeeding box, said blade being reciprocated at such a time that a free portion of the tape will project beyond an end of the box.

WALTER W. BRUST.